United States Patent [19]

Robinson

[11] Patent Number: 4,845,886
[45] Date of Patent: Jul. 11, 1989

[54] FISH COOLER ACCESS MEANS

[76] Inventor: Billie D. Robinson, 108 West Street, Hurst, Ill. 62949

[21] Appl. No.: 197,041

[22] Filed: May 19, 1988

[51] Int. Cl.⁴ ............................................. A01K 97/00
[52] U.S. Cl. ........................................ 43/55; 224/920
[58] Field of Search ............... 43/54.1, 55, 56, 1, 43/17; 224/920, 921; 206/223, 582; 220/254

[56] References Cited

U.S. PATENT DOCUMENTS

| | | | |
|---|---|---|---|
| 752,600 | 2/1904 | Sinclair | 43/55 |
| 1,388,187 | 8/1921 | Marble | 43/54.1 |
| 1,489,255 | 4/1924 | Lane | 43/55 |
| 2,800,244 | 7/1957 | Witt | 220/334 |
| 2,948,986 | 8/1960 | Williamson | 43/55 |
| 3,225,983 | 12/1965 | Majka | 43/55 |
| 3,559,329 | 2/1971 | Chiu | 43/55 |
| 3,749,274 | 7/1973 | Mele et al. | 220/1 T |
| 4,008,540 | 2/1977 | Brower | 43/55 |
| 4,070,786 | 1/1978 | Dunham | 43/55 |
| 4,570,374 | 2/1986 | Baxley | 43/55 |

*Primary Examiner*—Nicholas P. Godici
*Assistant Examiner*—William Scott Andes
*Attorney, Agent, or Firm*—Paul M. Denk

[57] ABSTRACT

An access structure, fabricated of a length of cylinder, having a flange provided at its bottom end, and a hinge door connected therewith, is provided for sliding insertion through an aperture located within the lid or cover of any compartment, such as an insulated box, other storage structure, or an ice chest; and a counterbalance spring holds the door to the bottom of the cylinder normally in a closed condition, but that under the weight of any fish or other aquatic animal deposited thereon, will open to allow deposition of such into the compartment for temporary storage.

1 Claim, 1 Drawing Sheet

U.S. Patent
Jul. 11, 1989
4,845,886
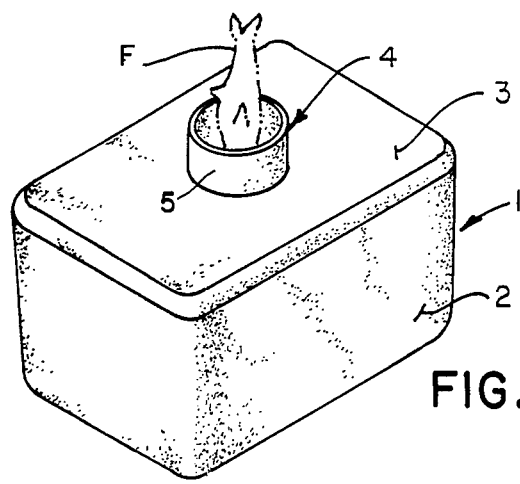
FIG.I.
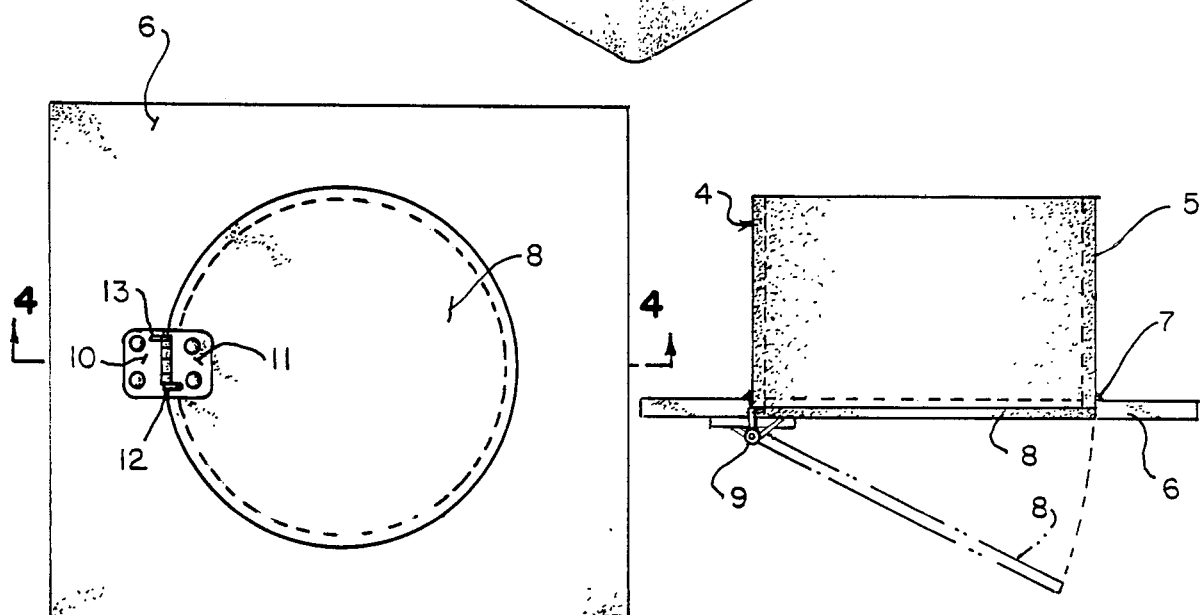
FIG.2.
FIG.3.
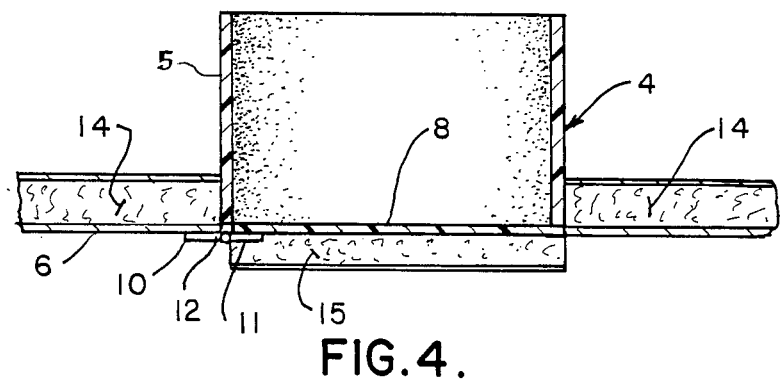
FIG.4.

FISH COOLER ACCESS MEANS

BACKGROUND OF THE INVENTION

This invention relates to an access means into a fish cooler, ice chest, or related type of thermally insulated case, and which provides means for ease of deposition of fish or other aquatic animals therein, as when one ventures upon a fishing expedition, so as to facilitate the storage of fish once caught, and to alleviate the need of having to continuously open the lid of the chest, or live well, and the accompanying inconvenience associated therewith.

There are a variety of prior art patents that are available for holding various animals, and closure means that are used in conjunction therewith, but it is not believed that such have been constructed in the manner as developed by the applicant, for facilitating the deposition of particularly fish into a live well or insulated ice chest, or the like. For example, the patent to Hoskins, U.S. Pat. No. 611,753, discloses a folding coop for poultry. In incorporates a spring loaded trap door within its top board for facilitating the insertion or removal of poultry from within a coop.

The patent to Sinclair, U.S. Pat. No. 752,600, discloses what appears to be a standard basket type of fish enclosure. It incorporates a spring loaded cover, such as the shown plate, and through which a fish may be deposited for entrance into the basket, as shown therein. The spring-loaded cover, through which the fish may be deposited, must have force exerted upon it to achieve its opening, as through the weight of the fish, but the particular structure utilized for fabrication of this basket, it is submitted, is quite distinct from the current invention.

The patent to Marble, U.S. Pat. No. 1,388,187, shows another type of creel or trout basket, and once again, it includes a pair of doors through which fish may be deposited into the shown basket. A pair of compartments are disclosed, one for holding fish, while the other may be used for holding equipment, bait, or the like.

The patent to Lane, U.S. Pat. No. 1,489,255, shows another style of fishing creel. This particular device is quite similar to what has been shown in the earlier described prior art patents herein, and includes a spring-biased door that closes its opening within the cover for the shown device.

The patent to Collins, U.S. Pat. No. 1,719,591, shows a form of fish box, and which includes, once again, a door for providing closure for its opening, and through which fish may be inserted after being caught. A spring hinge is useful for maintaining the shown door in closure.

The United States patent to Wells, U.S. Pat. No. 2,560,054, shows a boat creel, and what may be shown as what appears to be a sleeve type of opening through its top closure, in actual practice, is nothing more than another closure that is spring biased into a closed position, by means of a hinge, for closing off the shallow opening of the disclosed creel.

The patent to Dick, U.S. Pat. No. 2,566,719, shows another variation upon a fish basket. But, once again, in this particular instance, its cover plate is simply spring hinged into position for enclosure of its opening. Obviously, as with all of the baskets or creels as previously described herein, the pressure of the fish or its weight applied to the cover will open it to attain entrance of the fish therein, for its deposit into the shown baskets.

The patent to Witt, U.S. Pat. No. 2,800,244, is for use upon an entirely different structure. In this case, it is a cover for a garbage receptical. It is to be noted that this patent does show a little greater depth for its cover arrangement, although, as can be seen, its flap is generally arranged by means of a hinge proximate the upper perimeter or opening of the shown device. But, the shown structure does not present the principle of incorporating a length of tube or cylinder into a structure so as to assure that once material is deposited into such a cylinder, it will fall through its hinged lid, at its bottom thereof, for deposition into a retainer, such as occurs with the invention of this application.

The patent to Williamson, U.S. Pat. No. 2,948,986, shows a bait holder and dispenser. This particular device is moderately pertinent to the current invention, since it does show a length of sleeve, cylindrical in nature, extending through the top wall of its shown box. But, as can be noted, its cover is at the upper end of the disclosed sleeve, not at its bottom, nor is any indication that it is spring biased into closure. Thus, the concept of this prior art disclosure, as shown in this bait holder is generally designed for preventing the escape of grasshoppers or crickets, and not to function for the reverse situation, and that is to allow fish to be deposited into a sleeve or cylinder, thereby preventing their wiggling free, from the fisherman, or the chest in which they are to be deposited, with the bottom end of the cylinder having a cover that is spring biased to the same, so that the weight of the fish can cause the cover or closure means to open, and allow their automatic deposition therein without further effort or participation on the part of the fisherman.

The patent to Majka, U.S. Pat. No. 3,225,983, shows another form of combination of fishing creel and portable cooler. In this particular instance, the cooler simply contains a top cover, through which a central access opening is provided, and having a hand grip arranged upon a closure member for closing it off. Thus, while this device shows an aperture provided through the central portion of a cooler, other than that particular feature, it does not embody any of the other principles of this current development.

The patent to Chiu, U.S. Pat. No. 3,559,329, shows a form of a device identified as a bag, formed of straw, or the like, and has a neck portion integrally formed in it, through which fish, as noted, are inserted. The closure for the neck portion is attained through the expandable and resilient strips, which open as the fish is deposited therein, but which snap back into closure, as shown.

The United States patent to Mele, U.S. Pat. No. 3,749,274, shows another form of receptacle with spring hinge closure. This device is for use upon garbage cans, not fish receptacles, and simply incorporate another type of closure which is spring biased by means of the hinge means, to retain the closure into a closed position. There is a member provided behind the cover that is apparently furnished for the purpose of ventilation.

The patent to Brower, U.S. Pat. No. 4,008,540, shows another form of insulated fishing creel. This device is pertinent from the standpoint that it includes a tapered opening, through which the fish is deposited during entrance into the shown creel. Its door is spring biased, by means of a torsion spring, as noted.

Finally, the patent to Dunham, U.S. Pat. No. 4,070,786, discloses a fish receiving hopper. It shows a modified cooler, described as a conventional ice chest, and wherein its hopper means is formed through the lid portion, in order to provide a form of chute through which fish may be slid against its door during their deposition within the disclosed cooler. While this particular device may attain similar results to what is designed for the current invention, the structure involved, and its method of operation, is yet quite distinct from the invention to be defined and disclosed herein.

SUMMARY OF THE INVENTION

This invention contemplates the formation of a kit, generally fabricated of structural means, that may be sold in that configuration, or installed onto the standard thermally insulated ice chest, or other compartment, or even through the lid of a live well, to facilitate the task of the fisherman for promptly depositing any caught fish within such storage vessels, and alleviating the usual problem of chasing a wiggling fish all over the boat, or around the shore, once it has been caught.

The structure of this particular invention includes the usage of this invention in combination with a thermally insulated ice chest, a live well, or any other compartment that may be fabricated by the fisherman, or others, for use for holding freshly caught fish, but which preferably may be insulated, to attain their freshness once caught. The structure of this invention includes the formation of an aperture through preferably the lid of any such compartment, and then the desirably permanent mounting of the access means of this invention, therethrough, for ready usage.

The access means of this invention includes a length of cylinder, and having a closure means, hingedly mounted to its bottom end, with the hinge forming such mounting being spring biased, but predetermined to be counterbalance type of spring which will give, under the designed weight of particular sized fish, so as to allow the closure means door to open, under the weight of the fish, and provide for automatic deposition of fish within the storage compartment. Preferably, but not totally essential, an annulus, or plate, will be permanently secured proximate the bottom edge of the access means cylinder, and provide structure to which the operating hinge, and the closure means door, can be mounted, even in the kit form, so as to facilitate its installation. Likewise, when the access means kit may be slid from internally of the compartment door, through the cut aperture, this annulus or flange will come to rest against the underside or interior surface of the compartment lid, and can be glued or otherwise attached thereto, for prompt installation and assembly of this device, and ready for usage and application by the fisherman. Obviously, the various components of this invention may be insulated, either by the attachment of insulating foam, or other insulating means, thereto, as against the interior of the closure means door, in order to prevent any heat loss from occurring from interiorly of the compartment, as during its prolonged usage, such as when a fisherman may be partaking in such piscatorial pursuits during a day of fishing.

In view of the foregoing, it is a principal object of this invention to provide an access means kit that may be readily installed into any type of compartment, such as an insulated ice chest, or even through the lid of a live well, so as to facilitate the effort of the fisherman for deposit of any caught fish therein, with a minimum of effort.

Another object of this invention is to provide a length of cylinder, formed into an access means, and which has some height, so that once a fish is deposited within the cylinder, regardless how much it may wiggle or shimmy in place, it will drop to the bottom of the cylinder, without further participation on the part of the fisherman, and move into the storage compartment.

Still another object of this invention is to provide an access means, incorporating a spring biased closure means door, at its bottom edge thereof, and which is counterbalanced to provide for its opening, against its hinge, under the weight of any fish deposited upon its pivotally mounted door.

Another object of this invention is to provide an access means that can be easily and quickly installed by anyone upon a storage compartment, of the type that are used preserving freshly caught fish or other aquatic animals, during usage.

These and other objects will become more apparent to those skilled in the art upon reviewing the subject matter of this invention, as analyzed in its description of the preferred embodiment, in view of the drawings.

BRIEF DESCRIPTION OF THE DRAWINGS

In referring to the drawings, FIG. 1 discloses a storage compartment, as used for storing fish, in this particular instance comprising the standard thermally insulated ice chest, as shown, and having the access means mounted through its lid, for deposition of the shown fish therein;

FIG. 2 provides an interior view of the bottom of the access means of this invention disclosing its closure means door, as hingedly mounted to its perimeter flange that connects with the bottom of its access cylinder;

FIG. 3 provides a side view of the access means of this invention, with its hinged door in the process of being pivoted downwardly from its normal position of closure;

FIG. 4 provides a transverse sectional view of the access means, taken along line 4—4 of FIG. 2, showing how insulation is provided to various of its components so as to assure and minimize the loss of any chilling temperature from within its storage compartment, such as the ice chest as shown in FIG. 1.

DESCRIPTION OF THE PREFERRED EMBODIMENT

In referring to the drawings, FIG. 1 discloses a storage compartment, such as the ice chest 1, as disclosed, and which includes a base compartment 2, having an applied lid 3 connected thereon, as is customary in the art. The access means of this invention as shown at 4, and is disclosed having a fish, as at F, being deposited therein. As can be readily seen, regardless how much the fish may be wiggling or squirming, as is their customary practice, the tubular or cylinder means 5 is designed for extending upwardly, for that distance, so as to readily receive the length of fish therein, upon its dropping release by the fisherman, so that all further efforts by the fish to escape will simply lead to its further deposit within the ice chest or fish cooler 1, as shown.

The access means kit of this invention, as shown at 4, is readily disclosed in FIGS. 2 and 3. As noted, it includes the cylindrical portion 5, as previously explained, and incorporates a plate or flange 6, that rigidly connects to the bottom end of the cylinder 5, as by means of an adhesive, as at 7, or through the use of other connecting means. A closure means, or door 8 hingedly connects, by means of the hinge 9, at the perimeter of the closure means 8, and which is capable of being forced downwardly and opened, by means of pivot, and particularly under the weight of any fish that is deposited within the cylinder 5, and comes to rest upon the upper exterior surface of the closure means 8. The hinge means includes a pair of hinge flanges, as at 10 and 11, one being mounted to the flange or plate 6, while the other connects with the closure means 8. A hinge pin, as at 12, holds the hinge flanges together, in their usual fashion, and a hinge spring, as at 13, mounts upon the hinge flanges, in conjunction with its pin 12, so as to continuously bias the hinge flanges 10 and 11 against their respective plate 6, and door 8, so as to sustain said closure means into its closed position, flush against the bottom of the tube 5, and aligned with its supporting plate 6, as shown in FIG. 3. But, since the hinge spring 13 is designed to provide only sufficient bias to keep the door 8 in closure, when the weight of any fish is desposited upon the said closure means, as when dropped into the cylinder 5, it has a tendency to force and pivot the door 8 downwardly, (as shown in phantom line in FIG. 3) allowing the fish to slide through the opening and into the chest 1.

As can be seen in FIG. 4, preferably the access means 4 of this invention will have been installed into an insulated box, such as the ice chest 1 as previously explained, so that the insulation, as at 14, will totally surround the access means 4, and to further assure and prevent the loss of chilling temperature or heat from within the box, a layer of insulation, as at 15, may be adhesively or otherwise held to the underside or interior surface of the door 8, to assure its efficiency in operation. For example, fisherman are prone to spending a full day upon the water, while fishing, and when filling an ice chest or other insulated box of this current invention with fish for such a prolonged period of time, it is necessary that whatever chilling temperature exists initially within the box, may be maintained, so as to prevent any fermentation or degeneration of any fish or other aquatic animals deposited within the same, after prolonged usage.

In the preferred embodiment, the current invention may be fabricated from various available materials, such as the cylindrical section 5 being formed from four inch, five inch, six inch, or other diametered polyvinyl pipe, such as the type that is currently used by the plumbing trade. The plate flange 6 may be fabricated of polymer sheet material, or the like, and thereby provide a more sustained and useful life, during applicaton. The hinge, preferably, will be formed of stainless steel, so as to resist oxidation. Where the compartment 1 may be fabricated of wood materials, various plywood sheets may be used in its fabrication, and may have a dimension to that size as desired by the fisherman for usage for this application, and which will be easy for transport. It may have a plywood exterior surface, preferably fabricated of waterproof plywood, and have a one-half inch or other dimensioned foam insulation around its interior perimeter. It may further include a plexiglass plate upon its bottom surface, to resist deterioration to moisture. These are just examples of what type of materials may be utilized in the fabrication of this invention, and particular components of its compartment, if the standardized insulated ice chest is not used. The cylindrical portion 5 may have a height of approximately five inches, more or less.

While this invention may disclose the usage and permanent installation of a plate, as at 6, to the bottom proximate edge of the cylinder 4, and the closure means or door 8 being hingedly connected therewith, it is conceivable that the door 8 may be hingedly connected directly to the bottom edge of the cylinder 4 itself, without the usage or application of any flanged plate, with the cylinder being directly adhesively or otherwise connected to and through the aperture provided through the compartment lid, to provide the access means of this invention in its installation for usage by the fisherman in the manner as previously descibed.

Variations or modifications to the structure of this invention may occur to those skilled in the art upon reviewing the disclosure as provided herein. Such variations or modifications, if within the spirit of this invention, are intended to be encompassed within the scope of any claims to patent protection issuing upon this development. The description of the preferred embodiment set forth herein is done so for illustrative purposes only.

I claim:

1. An access means in combination with a fish cooler or live well, wherein said fish cooler and access means comprise a case for holding fish or related aquatic animal therein, and said case having a lid thereon, the improvement which comprises an access means mounted operatively associated with said lid, said lid having an aperture provided therethrough, and said access means being mounted through said lid aperture, and connecting with said lid, said access means comprising a length of cylinder, said cylinder extending in alignment with said aperture and through the case lid, a flange means securing to the bottom of the cylinder, within the case lid, said flange means formed as an annulus and extending around the lid aperture, and connecting to the interior of the case lid, a closure means hingedly connected to the flange, adjacent the lower end of said cylinder, a hinge means providing for the hinged connection of said closure means to the flange, and arranged adjacent the bottom of the said cylinder to provide it with closure, said hinge including a pair of flanges, one of said flanges being connected to said closure means, the other of said flanges being connected to the annulus, and a pin interconnecting the hinge flanges together, a spring means biasing said hinge flanges for sustaining a closing of the closure means against the bottom of the cylinder, and said spring means of said hinge being counter-balanced by the weight of a fish deposited upon the closure means to thereby open said closure means for deposition of said fish within the interior of said case.

* * * * *